United States Patent
Ziebart et al.

(10) Patent No.: US 10,875,574 B2
(45) Date of Patent: Dec. 29, 2020

(54) METHOD FOR OPERATING A TRAILER MANEUVERING ASSISTANCE SYSTEM OF A TRANSPORTATION VEHICLE AND TRAILER MANEUVERING ASSISTANCE SYSTEM FOR A TRANSPORTATION VEHICLE

(71) Applicant: VOLKSWAGEN AKTIENGESELLSCHAFT, Wolfsburg (DE)

(72) Inventors: Sascha Ziebart, Wettmershagen Calberlah (DE); Philipp Hüger, Rühen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 71 days.

(21) Appl. No.: 16/391,711

(22) Filed: Apr. 23, 2019

(65) Prior Publication Data

US 2019/0329821 A1    Oct. 31, 2019

(30) Foreign Application Priority Data

Apr. 26, 2018   (DE) .................. 10 2018 206 494

(51) Int. Cl.
*B62D 13/06*     (2006.01)
*G06T 7/62*      (2017.01)
*B60W 30/06*     (2006.01)

(52) U.S. Cl.
CPC ............. *B62D 13/06* (2013.01); *B60W 30/06* (2013.01); *G06T 7/62* (2017.01); *B60W 2300/14* (2013.01); *G06T 2207/30252* (2013.01)

(58) Field of Classification Search
CPC ........ B62D 13/06; B62D 15/027; G06T 7/62; G06T 2207/30252; B60W 30/06;
(Continued)

(56) References Cited

U.S. PATENT DOCUMENTS

2016/0379411 A1    12/2016   Harbach et al.
2018/0001721 A1*    1/2018   Huger .................. G06T 7/70

FOREIGN PATENT DOCUMENTS

DE     102006050550 A1    4/2008
DE     102014107917 A1    9/2015
(Continued)

*Primary Examiner* — Yuen Wong
(74) *Attorney, Agent, or Firm* — Barnes & Thornburg LLP

(57) ABSTRACT

A method for operating a trailer maneuvering assistance system of a transportation vehicle which includes maneuvering a transportation vehicle combination formed by the transportation vehicle and a trailer into a target position assisted by the trailer maneuvering assistance system. The system includes detecting the trailer by a sensor device of the transportation vehicle when the trailer) is coupled to the transportation vehicle, transmitting sensor data relating to the detected trailer to an analysis device of the trailer maneuvering assistance system, determining dimensions of the trailer in the longitudinal direction, the lateral direction and the vertical direction of the trailer based on the transmitted sensor data by the analysis device, and assisting the process of maneuvering the transportation vehicle combination into the target position while taking into account the determined dimensions of the trailer. Also disclosed is a trailer maneuvering assistance system for a transportation vehicle.

17 Claims, 1 Drawing Sheet

(58) Field of Classification Search
CPC ... B60W 2300/14; G08G 1/168; G08G 1/165; G06K 9/00791; B60R 2300/301; B60R 2300/30; B60R 1/00
See application file for complete search history.

(56) References Cited

FOREIGN PATENT DOCUMENTS

| | | |
|---|---|---|
| DE | 102015210816 A1 | 12/2016 |
| DE | 102015224786 A1 | 6/2017 |
| DE | 102015226695 A1 | 6/2017 |
| DE | 102016109954 A1 | 11/2017 |
| DE | 102016216962 B3 | 12/2017 |
| DE | 102016212181 A1 | 1/2018 |
| GB | 2541906 A | 3/2017 |
| WO | 2017207522 A1 | 12/2017 |

* cited by examiner

METHOD FOR OPERATING A TRAILER MANEUVERING ASSISTANCE SYSTEM OF A TRANSPORTATION VEHICLE AND TRAILER MANEUVERING ASSISTANCE SYSTEM FOR A TRANSPORTATION VEHICLE

PRIORITY CLAIM

This patent application claims priority to German Patent Application No. 10 2018 206 494.6, filed 26 Apr. 2018, the disclosure of which is incorporated herein by reference in its entirety.

SUMMARY

Illustrative embodiments relate to a method for operating a trailer maneuvering assistance system of a transportation vehicle and a trailer maneuvering assistance system for a transportation vehicle. Furthermore, the illustrative embodiments relate to a transportation vehicle with such a trailer maneuvering assistance system.

BRIEF DESCRIPTION OF THE DRAWINGS

The disclosed embodiments are explained in more detail below with reference to the drawings. The features and combinations of features mentioned in the description and in the description of the figures and/or shown in the figures alone can be used not only in the respectively specified combination, but also in other combinations or on their own without departing from the scope of the disclosure. In the figures identical or functionally equivalent elements are given the same reference characters. In the figures.

DETAILED DESCRIPTION

Figure 1:
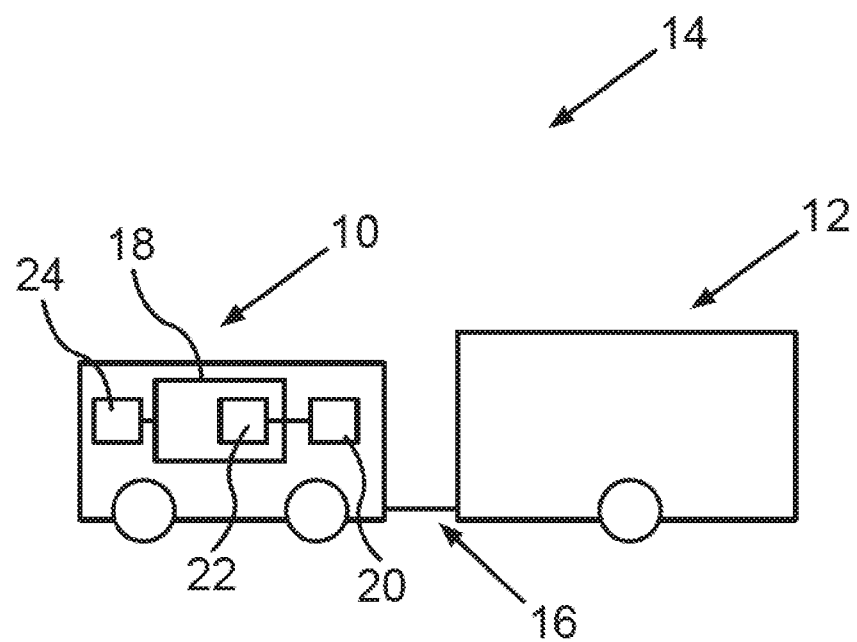
FIG. 1 shows a schematic representation of a transportation vehicle combination formed by a transportation vehicle and a trailer, wherein the transportation vehicle comprises a trailer maneuvering assistance system for assisting the process of maneuvering the transportation vehicle combination into a target position.

Trailer maneuvering assistance systems for assisting a driver of a transportation vehicle combination made up of a towing vehicle and a trailer vehicle usually require geometric information about a trailer that is currently being towed. This is especially important if the trailer maneuvering assistance system is to maneuver the trailer into a target position, for example, into a parking space, by automatically carrying out the longitudinal control and/or the lateral control. As described below, methods for operating trailer maneuvering assistance systems and corresponding trailer maneuvering assistance systems are already known. DE 10 2015 226 695 A1 describes a method for determining an overhang length of a single-axis trailer with a rigid tow bar. The overhang length describes the distance between the trailer axle and the rear of the trailer. A transportation vehicle combination consisting of a towing vehicle and the trailer is moving on a circular path with a constant radius. A motion vector of the trailer is determined by a camera. In addition, a tow bar length of the trailer and a bending angle of the trailer are determined. The overhang length is determined from the tow bar length, the bending angle and the motion vector. The length of the trailer is then given by the sum of the determined overhang length and the tow bar length.

DE 10 2015 224 786 A1 describes a method for maneuvering a transportation vehicle combination, consisting of a towing vehicle and a trailer, which is joined to the towing vehicle by a non-steerable tow bar. A tow bar length and a trailer overhang are determined while the transportation vehicle combination is travelling by using a reversing camera on the towing vehicle. A trailer maneuvering assistant assists a process of parking the transportation vehicle combination backwards with knowledge of the determined tow bar length and the determined trailer overhang by carrying out automatic longitudinal control and/or lateral control of the towing vehicle by the assistance system.

DE 10 2015 210 816 A1 reveals a method for determining a length of a trailer. In the case of a trailer decoupled from a transportation vehicle, a driver of the transportation vehicle receives instructions to orient the transportation vehicle in a specified arrangement relative to the trailer before the side view is recorded.

DE 10 2016 216 962 B3 reveals a camera monitor system as a replacement for an external mirror of a truck to save fuel costs. A trailer attached to the truck is recorded by a camera and displayed by a display, which replaces a conventional external mirror. When the trailer is attached, tracking of an outward image section displayed on the display is carried out to enable a driver to have a view of a rear edge of his trailer instead of only of the side curtain thereof. This necessity arises from the loss of the possibility of varying the field of view by moving the head as is the case with conventional mirrors.

Disclosed embodiments provide a solution by which safe and reliable maneuvering of a transportation vehicle combination formed by a transportation vehicle and a trailer into a target position is assisted.

Disclosed embodiments provide a method for operating a trailer maneuvering assistance system of a transportation vehicle and by a trailer maneuvering assistance system for a transportation vehicle.

With the disclosed method for operating a trailer maneuvering assistance system of a transportation vehicle, a process of maneuvering a transportation vehicle combination formed by the transportation vehicle and a trailer into a target position is assisted by the trailer maneuvering assistance system. The disclosed method is characterized in that the trailer is detected by a sensor device of the transportation vehicle when the trailer is coupled to the transportation vehicle, wherein the sensor data relating to the detected trailer are transmitted to an analysis device of the trailer maneuvering assistance system. Based on the determined sensor data, the analysis device determines dimensions of the trailer in the longitudinal direction, the lateral direction and the vertical direction of the trailer. The process of maneuvering the transportation vehicle combination into the target position is then assisted while taking into account the determined dimensions of the trailer.

It is thus provided according to the disclosed embodiments to obtain information or data about the three-dimensional geometry of the trailer and especially the trailer structure to take into account the data or information, i.e., the dimensions of the trailer in the longitudinal direction, the lateral direction and the vertical direction of the trailer, when assisting the process of maneuvering the transportation vehicle combination into the target position. The sensor device of the transportation vehicle can comprise diverse sensors on the transportation vehicle that can sense the surroundings of the transportation vehicle forwards, to the side and rearwards. For example, the sensor device can comprise cameras at different positions of the transportation vehicle, by which the coupled trailer can be fully detected. Radar and/or lidar sensors can also be used as sensors of the sensor device. The sensors of the sensor device of the transportation vehicle may be disposed in or on a B-pillar or C-pillar of the transportation vehicle and/or in the side mirrors. For detecting the entire trailer a turn may be necessary. The geometry of the trailer is detected by the analysis device of the trailer maneuvering assistance system using the sensor data. By collecting extensive sensor data, optionally by a plurality of sensors of the sensor device installed at different positions of the transportation vehicle, it is possible to produce a three-dimensional model of the trailer with knowledge of the dimensions of the trailer in the longitudinal direction, the lateral direction and the vertical direction.

The trailer maneuvering assistance system can thus maneuver a driver of the transportation vehicle combination reliably and safely into a defined target position, for example, into a parking space. In the simplest case, by suitable output means in the transportation vehicle the trailer maneuvering assistance system gives the driver concerned only indications of how he has to move the transportation vehicle combination to reach the target position, for example. It is also possible that the trailer maneuvering assistance system carries out automatic longitudinal control and/or lateral control of the transportation vehicle while taking into account the obtained or determined dimensions of the trailer, so that it is possible to maneuver the transportation vehicle combination completely automatically into a defined target position without action by the driver concerned, for example, when parking into a parking space in reverse.

It is possible by the disclosed method to determine the dimensions of the relevant trailer in all spatial directions. With knowledge of the dimensions it is possible to maneuver the transportation vehicle combination into a specified target position, for example, into a parking space, particularly, safely and reliably. Thus collisions with obstacles can be avoided. Because the dimensions of the trailer are known not only in the longitudinal direction but also in the lateral direction and in the vertical direction, above all lateral obstacles or even, for example, an obstacle limiting the height of a parking space can also be reliably taken into account when maneuvering into the target position.

A disclosed embodiment provides that a request to carry out a turn is issued by an output device of the transportation vehicle if it is determined using the sensor data that the dimensions of the trailer could not be determined completely based on the sensor data. Depending on the detection range of individual sensors and the positioning of the sensors of the sensor device it can occur that full or reliable detection of the dimensions of the trailer is not possible depending on the relative positioning of the trailer and the transportation vehicle. If, for example, the transportation vehicle and the trailer are aligned, it can sometimes be difficult or impossible, depending on the detection range of the sensor device, to provide sensor data with which the complete dimensions of the trailer can be detected. For such cases it may be provided that the request to carry out a turn is issued by the aforementioned output device of the transportation vehicle. The driver of the transportation vehicle combination can thus, for example, be advised audibly and/or visually that the full measurement of the trailer was not currently possible, and he should therefore make the aforementioned turn. In this case, for example, visual indications can also be output as to how far the driver should turn the steering wheel to carry out a sufficiently tight turn radius so that the dimensions of the trailer can be reliably determined. In this way it can be ensured that the important dimensions of the trailer for the maneuvering process can be detected fully in all spatial directions.

A further disclosed embodiment provides that the output device displays the turn to be carried out. For example, a trajectory that is to be travelled with the transportation vehicle with the trailer attached can be displayed by a display or even by a head-up display in the transportation vehicle. The driver thus obtains very specific instructions, for example, as to how far he has to turn the steering wheel for the turn to be carried out properly, as a result of which the sensor device can provide sufficiently usable and sufficiently good data, based on which the dimensions of the trailer can be determined in all spatial directions. The driver can also be visually and/or audibly informed, for example, by the output device if sufficient adequately good sensor data could be collected to detect the dimensions of the trailer in all spatial directions. Thus the driver obtains an indication of when he can end the turn, so that he can then move the transportation vehicle combination into the vicinity of the desired target position, starting from where the trailer maneuvering assistance system, for example, takes over the longitudinal control and lateral control fully autonomously to reliably maneuver the transportation vehicle combination into the target position with knowledge of the determined dimensions of the trailer.

In a further disclosed embodiment it is provided that based on the determined dimensions a three-dimensional model of the trailer is produced and displayed so as to partially transparently overlay a real displayed image of the trailer. The three-dimensional model of the trailer and the real image of the trailer can, for example, be displayed by a display in the vicinity of a central console of the transportation vehicle. Thus a driver can detect in a simple way whether and to what extent the dimensions of the trailer have been determined correctly, because the three-dimensional model is represented as a partially transparent overlay over the real image of the trailer.

In a further disclosed embodiment it is provided that an image of the trailer currently recorded by a camera of the sensor device or an image of the trailer recorded during a turn by the transportation vehicle combination is used as the real image of the trailer. In the first case, thus a current camera image is simply used that is recorded by the sensor device of the towed trailer. If because of the current relative positioning of the transportation vehicle and the trailer the perspective of the camera is not very suitable or is unsuitable for showing the three-dimensional model of the real image overlaid, so that the driver can directly and simply detect whether the dimensions have been determined correctly, then—as described in the second alternative—the image of the trailer acquired during a previously performed turn by the transportation vehicle combination can be used. In the latter case it can be ensured that the recorded image of the trailer is represented from a favorable perspective view, so that using the overlay of the three-dimensional model of the trailer and the real image of the trailer the driver can simply detect whether the dimensions and the three-dimensional model of the trailer have been determined accurately enough.

In a further disclosed embodiment it is provided that a user request is issued to displace respective outer edges of the three-dimensional model of the trailer by a control device of the transportation vehicle until the outer edges coincide with the outer edges of the real image of the trailer, wherein the outer edges are displaced according to a detected operation of the control device. For example, the control device can be a touch screen, by which the three-dimensional model and the real image of the trailer are displayed. The driver can—if necessary—displace the outer edges of the three-dimensional model by simple manipulation on the touch screen until the outer edges of the three-dimensional model coincide with the outer edges of the real image of the trailer. In this connection, it can be provided that the user or driver is requested to confirm the completion of his correction measures—i.e., the displacement of the outer edges of the three-dimensional model of the trailer. Once the confirmation has been detected, the displaced outer edges of the three-dimensional model of the trailer may be used as a basis to correct the dimensions of the trailer in all spatial directions. The corrected dimensions of the trailer and the corrected three-dimensional model of the trailer are then used by the trailer maneuvering assistance system to assist the driver during the process of maneuvering the transportation vehicle combination into the target position. The driver of the transportation vehicle combination can thus correct the determined three-dimensional model of the trailer in a simple way if required, so that accurate dimensions of the trailer in all spatial directions can be used as a basis during the maneuvering process.

A further disclosed embodiment provides that after the dimensions of the trailer have been determined once, the determined dimensions are stored together with trailer-specific properties, in particular, an electrical resistance of a connection system of the trailer, a tow bar length of the trailer and/or driving dynamics properties of the trailer, wherein the trailer maneuvering assistance system is checked before a new maneuvering process as to whether the trailer-specific properties are specified and in this case the already determined dimensions of the trailer are used during maneuvering. Thus if the dimensions of the relevant trailer have been determined once, then it is not necessary to determine the dimensions of the trailer again each time before a maneuvering process. Because the determined dimensions of the trailer together with the aforementioned trailer-specific properties are stored, the trailer maneuvering assistance system can determine by checking the trailer-specific properties whether the trailer that is currently being towed is a trailer with dimensions that have already been determined in the manner described above. For example, using a trailer-specific electrical resistance of a connection system of the trailer it can be determined in a simple way whether it is the same trailer for which the dimensions have already been determined. For example, it is also possible to determine the length of the tow bar from a movement of a trailer tow bar during a known movement of the transportation vehicle. As a result, it is possible with the trailer attached and using the tow bar length to determine whether it is a trailer for which the dimensions have already been determined in the described manner. Trailer-specific driving dynamics properties of the trailer, for example, snaking behavior or similar, can also be stored. The driving dynamics properties of the trailer can be checked while travelling with the transportation vehicle combination and compared with the stored data. In this way it is also possible to determine whether the towed trailer is a trailer for which the dimensions have already been determined. Thus it is possible to use once-defined dimensions for a specific trailer again and again without the sensor device of the transportation vehicle having to sense the currently coupled trailer again and without the analysis device having to determine the dimensions of the trailer based on the sensor data once again.

The disclosed trailer maneuvering assistance system for a transportation vehicle is designed to assist a process of maneuvering a transportation vehicle combination formed by the transportation vehicle and a trailer into a target position. The trailer maneuvering assistance system is designed to receive sensor data from a sensor device of the transportation vehicle that is designed to detect the trailer when the trailer is coupled to the transportation vehicle and to transmit the sensor data relating to the detected trailer to an analysis device of the trailer maneuvering assistance system. The analysis device is designed to determine the dimensions of the trailer in the longitudinal direction, the lateral direction and the vertical direction of the trailer based on the transmitted sensor data. The trailer maneuvering assistance system is also designed to assist the process of maneuvering the transportation vehicle combination into the target position while taking into account the determined dimensions. Benefits provided by the disclosed method are to be considered to be benefits of the trailer maneuvering assistance system and vice-versa, wherein the trailer maneuvering assistance system comprises methods or mechanisms for carrying out the disclosed method.

The disclosed transportation vehicle comprises the disclosed trailer maneuvering assistance system or an embodiment of the disclosed trailer maneuvering assistance system.

A transportation vehicle combination 14 formed by a transportation vehicle 10 and a trailer 12 is shown in a schematic side view. The transportation vehicle 10 can be essentially any towing vehicle, such as, for example, passenger vehicles and trucks. In the following the trailer 12 is only represented as a single-axle trailer. The trailer 12 can however also be a multi-axle trailer. In the present case, the trailer 12 shown comprises a tow bar 16. It can be both a rigid tow bar and a rotatable tow bar. It is further also possible that the trailer 12 does not require a tow bar 16 at all but is embodied as a semi-trailer.

The transportation vehicle 10 comprises a trailer maneuvering assistance system 18 that is designed to assist a process of maneuvering the transportation vehicle combination 14 into a target position, for example, into a parking space or similar. The trailer maneuvering assistance system 18 is designed to receive sensor data from a sensor device that is designed to detect the trailer 12 when the trailer 12 is coupled to the transportation vehicle 10 and to transmit sensor data relating to the detected trailer 12 to an analysis device 22 of the trailer maneuvering assistance system 18. The analysis device 22 is designed to determine the dimensions of the trailer 12 in the longitudinal direction, the lateral direction and the vertical direction of the trailer 12 based on the transmitted sensor data. The trailer maneuvering assistance system 18 is designed to assist the process of maneuvering the transportation vehicle combination 14 into the target position while taking into account the determined dimensions.

The sensor device 20 of the transportation vehicle 10 can comprise diverse types of sensors at diverse positions of the transportation vehicle 10. The sensor device 20 can thus, for example, comprise cameras disposed in the external mirrors and on the pillars of the transportation vehicle, in particular, on the B-pillar and the C-pillar. In addition, the sensor device 20 can, for example, also comprise a reversing camera. Furthermore, it is also possible that the sensor device 20, for example, also comprises radar and/or lidar sensors, by which the coupled trailer 12 can be detected. All of the sensors of the sensor device 20 can transmit corresponding sensor data to the sensor device 20, which based thereon can determine the dimensions of the trailer 12 in all spatial directions.

If a driver of the transportation vehicle combination 14 wishes to maneuver the transportation vehicle combination 14, for example, in reverse into a parking space and to be assisted by the trailer maneuvering assistance system 18, then, for example, he can activate the trailer maneuvering assistance system 18 if reverse gear is engaged, wherein it is also possible that the trailer maneuvering assistance system 18 activates itself automatically once the reverse gear is engaged. The attached trailer 12 is detected by the sensor device 20, wherein related sensor data are transmitted to the analysis device 22. The analysis device then determines the dimensions of the trailer 12 in the longitudinal direction, the lateral direction and the vertical direction of the trailer 12 based on the sensor data. As a result, it is also possible to reliably determine the dimensions in all spatial directions of the structure of the trailer 12, which is not referred to in detail here. Then the trailer maneuvering assistance system 18 assists the desired maneuvering process for the transportation vehicle combination 14, for example, for autonomous or partly autonomous reversing into a parking space. The trailer maneuvering assistance system 18 can thus, for example, carry out the longitudinal control and lateral control of the transportation vehicle 10 fully to maneuver the transportation vehicle combination 14 into the parking space safely and without collisions with knowledge of the determined dimensions of the trailer 12.

Depending on the detection range of the different sensors of the sensor device 20 and depending on the relative positioning of the trailer 12 to the transportation vehicle 10 it can occur that the sensor device 20 cannot provide sufficiently good sensor data on the basis of which the dimensions of the trailer 12 can be reliably determined in all spatial directions. In that case it can be provided that a request to carry out a turn is issued, for example, by a touch screen 24 of the transportation vehicle 10 acting as an output device, i.e., if using the sensor data it is determined that the dimensions of the trailer 12 could not be determined completely based on the sensor data. By the touch screen 24, for example, a turn that is specifically to be carried out can be displayed, for example, by displaying a target trajectory for the turn to be carried out. It is also alternatively or additionally possible for the turn to be carried out, for example, by incorporating a head-up display that is not shown here in detail of the transportation vehicle 10. Either way, the driver of the transportation vehicle 10 can recognize the turn that is to be carried with the transportation vehicle combination 14 in the forward direction so that the dimensions of the trailer 12 can be reliably determined. As soon as sufficiently good sensor data could be determined during the turn, the touch screen 24 can signal that the turn can be ended, for example. Alternatively or additionally, information relating to the turn can also be reproduced in audible form. If sufficiently good dimensions of the trailer 12 are then available, the trailer maneuvering assistance system 18 can park the transportation vehicle combination 14 into a parking space, for example, partly autonomously or fully autonomously.

It may be provided that based on the determined dimensions a three-dimensional model 26 of the trailer 12 is produced and is displayed so that it partially transparently overlays a real displayed image 28 of the trailer 12.

Figure 2:
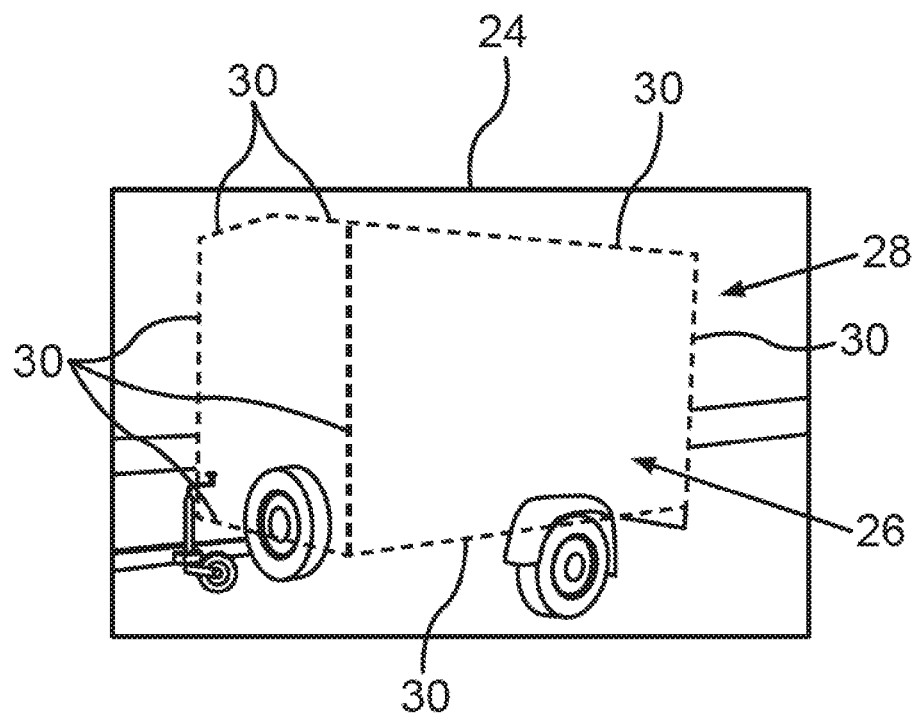
FIG. 2 shows a display device of the transportation vehicle, by which a three-dimensional model of the trailer is displayed so as to overlay a real displayed image of the trailer semi-transparently.

In FIG. 2 the touch screen 24 of the transportation vehicle 10 is shown, by which the three-dimensional model 26 is displayed as a partially transparent overlay of the real image 28. Using the touch screen 24, the driver of the transportation vehicle 10 can thus simply detect whether the dimensions and the three-dimensional model 26 have been determined correctly. The real image 28 of the trailer 12 can be an image of the trailer 12 currently recorded by a reversing camera of the sensor device 20. Alternatively, it is also possible that an image of the trailer 12 previously recorded during a turn by the transportation vehicle combination 14 is used. In the latter case, it can be ensured that the real image 28 is displayed from a favorable perspective in each case, so that the driver of the transportation vehicle 10 can simply determine whether the three-dimensional model 26 corresponds sufficiently to reality.

By loudspeakers and/or the touch screen 24, a user request can be issued to displace respective outer edges 30 of the three-dimensional model 26 of the trailer 12 by the touch screen 24 until the outer edges 30 coincide with respective outer edges of the real image 28 that are not characterized here in detail. The outer edges 30 are displaced according to a detected operation of the touch screen 24. By the touch screen 24, the driver can, for example, confirm if he has completed his correction measures regarding the displacement of the outer edges 30. Then the dimensions of the trailer 12 are determined based on the displaced outer edges 30 and are used as the basis for assisting the maneuvering process by the trailer maneuvering assistance system 18.

Once-determined dimensions of the trailer 12 and the three-dimensional model 26 can also be stored together with trailer-specific properties. The trailer-specific properties can, for example, be an electrical resistance of a connection system of the trailer 12, a tow bar length of the trailer 12 and/or very specific driving dynamics properties of the trailer 12, for example, a snaking behavior or similar. Before a new maneuvering process, the trailer maneuvering assistance system 18 checks whether the trailer-specific properties are specified, wherein in that case the already determined dimensions of the trailer 12 are used during maneuvering. As a result, it is not necessary to determine the dimensions of the trailer 12 again and again.

By the described method and the described trailer maneuvering assistance system 18, it is thus possible to determine the dimensions of the trailer 12 with the trailer attached 12 and thus based thereon to take into account or to use a three-dimensional model 26 of the trailer 12 and the data or information when assisting the process of maneuvering the transportation vehicle combination 14 into a well-defined target position. With knowledge of the geometry of the trailer 12 it is thus possible to reliably avoid collisions with obstacles when maneuvering the transportation vehicle combination 14. Thus, safe and reliable maneuvering of the transportation vehicle combination 14 by the trailer maneuvering assistance system 18 can be guaranteed.

REFERENCE CHARACTER LIST

10 transportation vehicle
12 trailer
14 transportation vehicle combination
16 tow bar
18 trailer maneuvering assistance system
20 sensor device
22 analysis device
24 touch screen
26 three-dimensional model of the trailer
28 real image of the trailer
30 outer edges of the three-dimensional model

The invention claimed is:

1. A trailer maneuvering assistance system for a transportation vehicle to assist a maneuvering process of a transportation vehicle combination formed by the transportation vehicle and a trailer into a target position,
wherein the trailer maneuvering assistance system comprises a plurality of cameras, and receives sensor data from a sensor device of the transportation vehicle, wherein the sensor device detects the trailer when the trailer is coupled to the transportation vehicle and transmits sensor data relating to the detected trailer to the trailer maneuvering assistance system,
wherein the trailer maneuvering assistance system determines dimensions of the trailer in a longitudinal direction, lateral direction and vertical direction of the trailer based on the transmitted sensor data, and assists the process of maneuvering the transportation vehicle combination into the target position based on the determined dimensions.

2. The trailer maneuvering assistance system of claim 1, wherein a request instruction to carry out a turn is issued by an output device of the transportation vehicle in response to the trailer maneuvering assistance system determining that the sensor data is unreliable to determine the dimensions of the trailer fully in all spatial directions.

3. The trailer maneuvering assistance system of claim 2, wherein the output device indicates the turn that is to be carried out by a driver of the transportation vehicle.

4. The trailer maneuvering assistance system of claim 3, wherein a three-dimensional model of the trailer is produced based on the determined dimensions and is displayed on the output device, wherein the three-dimensional model of the trailer is partially transparent and overlaid over a real displayed image of the trailer.

5. The trailer maneuvering assistance system of claim 4, wherein the real image of the trailer is an image of the trailer currently recorded by a camera of the sensor device or an image of the trailer recorded during a turn by the transportation vehicle combination.

6. The trailer maneuvering assistance system of claim 4, wherein the system issues a user request to displace respective outer edges of the three-dimensional model of the trailer by a control device of the transportation vehicle until the outer edges coincide with the outer edges of the real image of the trailer, wherein the outer edges are displaced according to a detected operation of the control device.

7. The trailer maneuvering assistance system of claim 6, wherein the trailer maneuvering assistance system determines the dimensions of the trailer based on displaced outer edges.

8. The trailer maneuvering assistance system of claim 1, wherein, after the dimensions of the trailer have been determined once, the determined dimensions are stored together with trailer-specific properties, wherein before a new maneuvering process the trailer maneuvering assistance system checks whether the trailer-specific properties are specified and uses the already determined dimensions of the trailer during maneuvering.

9. A transportation vehicle including a trailer maneuvering assistance system to assist a maneuvering process of a transportation vehicle combination formed by the transportation vehicle and a trailer into a target position, wherein the system comprises a plurality of cameras and receives sensor data from a sensor device of the transportation vehicle, wherein the sensor device detects the trailer when the trailer is coupled to the transportation vehicle and transmits sensor data relating to the detected trailer to the trailer maneuvering assistance system,
wherein the trailer maneuvering assistance system determines dimensions of the trailer in a longitudinal direction, lateral direction and vertical direction of the trailer based on the transmitted sensor data, and
wherein the trailer maneuvering assistance system assists the process of maneuvering the transportation vehicle combination into the target position based on the determined dimensions.

10. A method for operating a trailer maneuvering assistance system of a transportation vehicle, with which a process of maneuvering a transportation vehicle combination formed by the transportation vehicle and a trailer into a target position is assisted by the trailer maneuvering assistance system which comprises a plurality of cameras, the method comprising:
detecting the trailer by a sensor device of the transportation vehicle when the trailer is coupled to the transportation vehicle;
transmitting sensor data relating to the detected trailer to an analysis device of the trailer maneuvering assistance system;
determining dimensions of the trailer in longitudinal direction, lateral direction and vertical direction of the trailer based on the transmitted sensor data; and
assisting the process of maneuvering the transportation vehicle combination into the target position based on the determined dimensions of the trailer.

11. The method of claim 10, wherein a request an instruction to carry out a turn is issued by an output device of the transportation vehicle in response to the sensor data determining that is unreliable to determine the dimensions of the trailer fully in all spatial directions.

12. The method of claim 11, wherein the output device indicates the turn that is to be carried out.

13. The method of claim 10, wherein a three-dimensional model of the trailer is produced based on the determined dimensions and is displayed on the output device, wherein the three-dimensional model of the trailer is partially transparent and overlaid over a real displayed image of the trailer.

14. The method of claim 13, wherein the real image of the trailer is an image of the trailer currently recorded by a camera of the sensor device or an image of the trailer recorded during a turn by the transportation vehicle combination.

15. The method of claim 13, wherein the system issues a user request to displace respective outer edges of the three-dimensional model of the trailer by a control device of the transportation vehicle until the outer edges coincide with the outer edges of the real image of the trailer, wherein the outer edges are displaced according to a detected operation of the control device.

16. The method of claim 15, wherein the dimensions of the trailer are determined based on displaced outer edges.

17. The method of claim 10, wherein, after the dimensions of the trailer have been determined once, the determined dimensions are stored together with trailer-specific properties, wherein, before a new maneuvering process, the trailer maneuvering assistance system checks whether the trailer-specific properties are specified and uses the already determined dimensions of the trailer during maneuvering.

* * * * *